United States Patent
Toillon et al.

(10) Patent No.: US 9,774,472 B2
(45) Date of Patent: Sep. 26, 2017

(54) NETWORK FOR TRANSMITTING INFORMATION WITH AT LEAST TWO LOOPS

(71) Applicant: THALES, Neuilly sur Seine (FR)

(72) Inventors: Patrice Toillon, Meudon la Foret (FR); Michael Templier, Meudon la Foret (FR); Gabrielle Sarouille, Meudon la Foret (FR); Xavier Moreau, Meudon la Foret (FR)

(73) Assignee: THALES, Neuilly sur Seine (FR)

( * ) Notice: Subject to any disclaimer, the term of this patent is extended or adjusted under 35 U.S.C. 154(b) by 0 days.

(21) Appl. No.: 14/654,035

(22) PCT Filed: Dec. 11, 2013

(86) PCT No.: PCT/EP2013/076273
§ 371 (c)(1),
(2) Date: Jun. 19, 2015

(87) PCT Pub. No.: WO2014/095533
PCT Pub. Date: Jun. 26, 2014

(65) Prior Publication Data
US 2015/0372838 A1    Dec. 24, 2015

(30) Foreign Application Priority Data
Dec. 21, 2012    (FR) .................................... 12 03583

(51) Int. Cl.
*H04L 12/42*    (2006.01)
*H04L 12/40*    (2006.01)

(52) U.S. Cl.
CPC ........ *H04L 12/42* (2013.01); *H04L 12/40169* (2013.01); *H04L 2012/421* (2013.01)

(58) Field of Classification Search
CPC ................. H04L 12/42; H04L 12/4637; H04L 2012/421; H04L 12/40169;
(Continued)

(56) References Cited

U.S. PATENT DOCUMENTS 6,111,853 A * 8/2000 Goodman ............... H04J 3/085
                                                340/2.9
6,233,704 B1 * 5/2001 Scott ..................... G06F 13/426
                                                709/200
(Continued)

FOREIGN PATENT DOCUMENTS

| EP | 2148473 A1 | 1/2010 |
| EP | 2528282 A1 | 11/2012 |
| WO | 2008/106907 A1 | 9/2008 |

OTHER PUBLICATIONS

English Translation of International Search Report for PCT/EP2013/076273 dated Jan. 14, 2014.
(Continued)

*Primary Examiner* — Hoang-Chuong Vu
(74) *Attorney, Agent, or Firm* — Thompson Coburn LLP

(57) ABSTRACT

This transmission network for transmitting information, of the type comprising at least two associated loops (2, 3) for transmitting information, in each of which functional nodes (4, 5) are integrated, each comprising at least one distribution module for distributing messages (6, 7) between the input and output ports of the node and at least one network interface module (8, 9) associated with this distribution module, is characterized in that the network interface modules (8, 9) of at least certain of the nodes of at least one of the loops (2, 3) are connected to the distribution modules (6, 7) for distributing the nodes of at least one other loop.

8 Claims, 1 Drawing Sheet

(58) Field of Classification Search
CPC .......... H04L 2001/0095; H04L 12/422; H04L 12/437; H04L 2012/5612; H04L 2012/6437; H04L 2027/0079
See application file for complete search history.

(56) References Cited

U.S. PATENT DOCUMENTS

| | | | | |
|---|---|---|---|---|
| 6,307,859 B1* | 10/2001 | Tedenstig | ................ | H04J 3/08 370/395.61 |
| 6,647,429 B1* | 11/2003 | Semal | ................ | H04L 12/4608 709/249 |
| 6,707,789 B1* | 3/2004 | Arslan | ................ | H04L 12/66 370/218 |
| 8,630,185 B1* | 1/2014 | Frumkin | ................ | H04L 45/12 370/238 |
| 2002/0194371 A1* | 12/2002 | Kadoi | ................ | H04L 12/42 709/239 |
| 2003/0074469 A1* | 4/2003 | Busi | ................ | H04L 12/4625 709/238 |
| 2003/0086368 A1* | 5/2003 | Limaye | ................ | H04J 3/085 370/216 |
| 2004/0151172 A1* | 8/2004 | Notani | ................ | H04J 3/085 370/380 |
| 2005/0169629 A1* | 8/2005 | Shioda | ................ | H04B 10/075 398/5 |
| 2006/0120279 A1* | 6/2006 | Mitsumori | ................ | H04J 3/14 370/218 |
| 2007/0165658 A1* | 7/2007 | Mutoh | ................ | H04L 12/4637 370/403 |
| 2008/0317466 A1* | 12/2008 | Chung | ................ | H04J 14/0204 398/59 |
| 2009/0219821 A1* | 9/2009 | Kamachi | ................ | H04L 12/437 370/242 |
| 2011/0007666 A1* | 1/2011 | Gurdan | ................ | G10H 1/0066 370/254 |
| 2012/0287779 A1* | 11/2012 | Sugawara | ................ | H04L 12/437 370/228 |
| 2013/0108263 A1* | 5/2013 | Srinivas | ................ | H04Q 3/0083 398/45 |
| 2013/0124767 A1* | 5/2013 | Prasadh | ................ | G06F 13/385 710/111 |
| 2014/0313886 A1* | 10/2014 | Yuan | ................ | H04L 12/437 370/228 |

OTHER PUBLICATIONS

English Translation of Written Opinion for PCT/EP2013/076273 dated Jan. 14, 2014.
Preliminary Search Report for FR Application 1203583 dated Sep. 19, 2013.

* cited by examiner

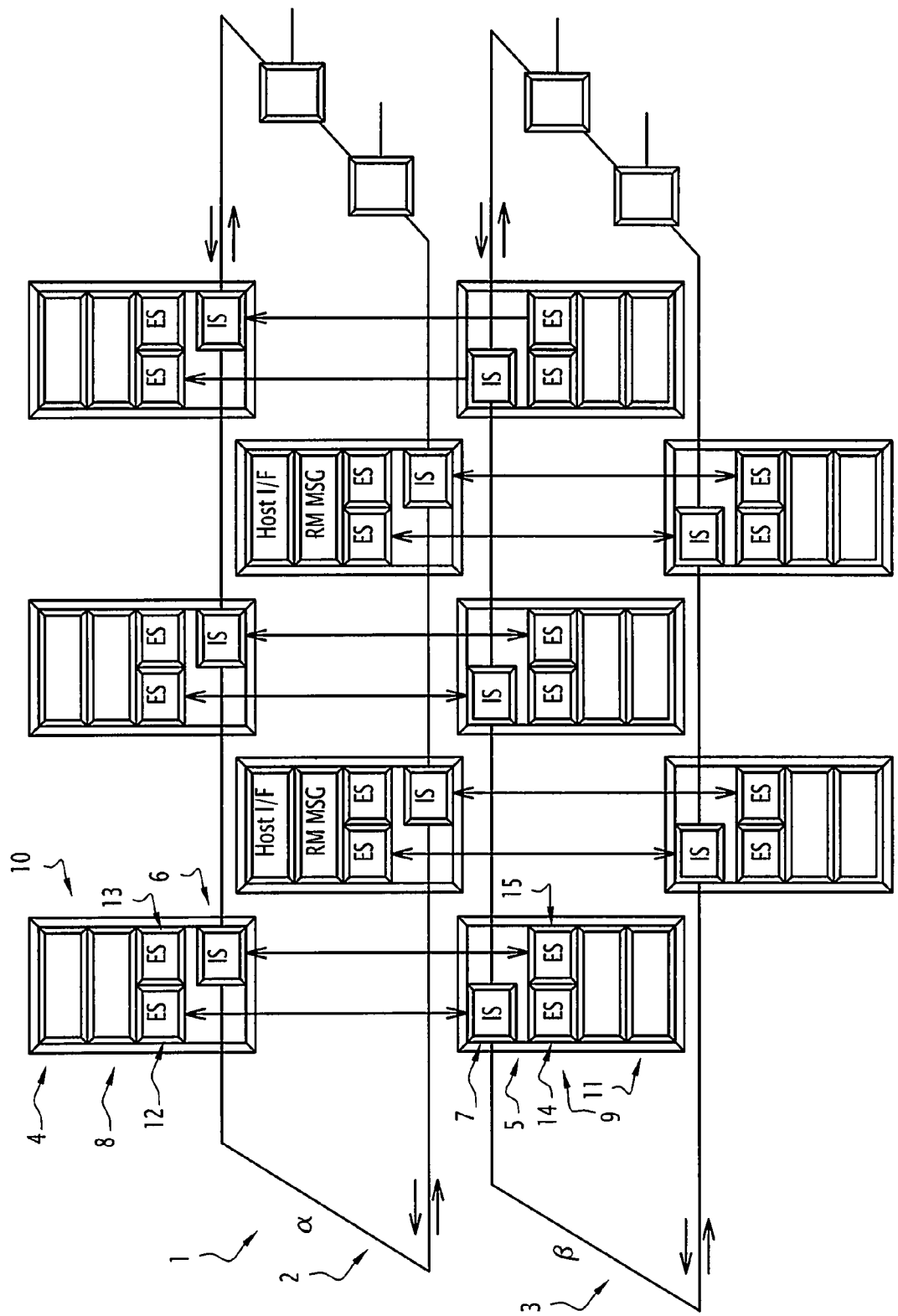

NETWORK FOR TRANSMITTING INFORMATION WITH AT LEAST TWO LOOPS

CROSS-REFERENCE TO RELATED APPLICATIONS

This application is a U.S. National Phase application of PCT/EP2013/076273, filed on Dec. 11, 2013, which claims the benefit of French Application No. 12/03583, filed Dec. 21, 2012, both of which are incorporated herein by reference in their entireties.

FIELD OF THE INVENTION

The present invention relates to a transmission network for transmitting information.

More particularly, the invention relates to a network of such type that comprises at least two associated loops for transmitting information and in each of which functional nodes are integrated.

BACKGROUND OF THE INVENTION

Already known in the state of the art are loop type networks of this kind for transmitting information, and in which the functional nodes each comprise at least one message distribution module for distributing messages between the input and output ports of the node and at least one network interface module associated with this distribution module.

The objective of the designers of such type of networks is to enhance their security and improve their operational reliability, and in particular to increase the resistance and tolerance of these networks to failures and breakdowns.

There are indeed certain applications such as in the field of on board avionics systems, in which it is necessary for this resistance and tolerance to be at the highest level possible.

SUMMARY OF THE INVENTION

The aim of the invention is therefore to provide improvements to this type of networks.

To this end, the object of the invention relates to a transmission network for transmitting information, of the type comprising at least two associated loops for transmitting information, in each of which functional nodes are integrated, each comprising at least one distribution module for distributing messages between the input and output ports of the node and at least one network interface module associated with this message distribution module, characterised in that the network interface modules of at least certain of the nodes of at least one of the loops are connected to the distribution modules for distributing the nodes of at least one other loop.

Based on other characteristic features of the network according to the invention taken into consideration alone or in combination:
each node comprises at least one distribution module for distributing messages connected to at least one network interface module associated with at least one application module;
the loops are loops for conditional or unconditional propagation of messages, independent thereof;
at least one of the loops is a loop for unidirectional propagation of messages;
at least one of the loops is a loop for bidirectional propagation of messages;
the loops are loops for propagation in the opposite direction or in the same direction of the messages;
at least certain of the distribution modules of at least certain nodes are associated with multiple network interface modules of nodes integrated in at least one other loop;
at least certain of the network interface modules of at least certain nodes are associated with multiple distribution modules for distributing nodes integrated in at least one other loop.

BRIEF DESCRIPTION OF THE DRAWINGS

The invention will be better understood upon reading the description which will follow, provided solely by way of example and with reference made to the accompanying drawing which represents a block diagram illustrating an exemplary embodiment of a transmission network for transmitting information according to the invention.

DETAILED DESCRIPTION OF THE INVENTION

In fact the illustration in this FIGURE represents a transmission network for transmitting information which is denoted by the general reference numeral 1.

This network is for example applicable in the field of on board avionics systems. Quite obviously, other applications may be envisaged.

In fact this network includes at least two associated loops for transmitting information, such as for example alpha loops denoted by the general reference numeral 2 and beta loops denoted by the general reference numeral 3.

In the example of embodiment illustrated, the alpha and beta loops, 2 and 3, are each bidirectional propagation loops.

Quite obviously, it goes without saying that other embodiments of these loops may be envisaged and that they may loops for propagation in the same direction or in the opposite direction of these messages.

Loops for unidirectional propagation of these messages in the same direction or in the opposite direction or even a mix of unidirectional and bidirectional propagation may also be envisaged.

Similarly, these loops may also be loops for uni or bi-directional propagation of messages, they then propagate in one single direction or in both the directions of flow of each loop.

These loops include, as has been illustrated, functional nodes which are then connected for example, in series one after the other in the loops of the network.

For the purposes of facilitating clarity, only one node will be described in detail by loop of the network.

Thus, for example the loop 2 includes one node denoted by the general reference numeral 4 while the loop 3 includes one node denoted by the general reference numeral 5.

In a conventional manner, these nodes 4 and 5 include at least one distribution module for distributing messages between the input and output ports of this node, connected to the rest of the network, this distribution module for distributing messages being denoted by the reference numerals 6 and 7 respectively for the nodes 4 and 5 described above.

In similar fashion, each node also includes at least one network interface module associated with this distribution module, this network interface module being denoted by the reference numerals 8 and 9 respectively for the nodes 4 and 5.

Each node also includes for example at least one application module, which are denoted by the reference numerals 10 and 11 respectively in these FIGURE, for the nodes 4 and 5 of the network.

In fact and as it has been illustrated, the nodes 4 and 5 and more particularly the network interface modules 8 and 9 of these nodes, include for example two portions, respectively 12 and 13, and 14 and 15 for nodes 4 and 5.

The network interface modules of at least certain of the nodes of at least one of the loops are then connected to the distribution modules for distributing the nodes of at least one other loop.

This is illustrated in this FIGURE, for example, by the fact that the portion 12 of network interface module 8 of node 4 integrated in the loop 2, is connected to the distribution module 7 of node 5 integrated in the loop 3.

In similar fashion, the portion 15 of the network interface module 9 of the node 5 is connected to the distribution module 6 of the node 4 of the other loop 2.

This then makes it possible to multiply the possible opportunities for exchanges of information between the loops 2 and 3 of the network 1 and therefore to increase the resistance to failure or breakdown of this network presenting these characteristic features.

According to various different examples of embodiment of this network, the loops 2 and 3 may be loops for unconditional propagation of messages, independent of the latter, that is to say, the nodes are only bringing about transiting of the messages from their entry to their exit that is to say, from one neighbouring node forwarded to another neighbouring node at least, without analysis of their content and in particular without analysis of their recipient field for example.

Quite obviously various different embodiments may be envisaged and at least certain of the distribution modules of at least certain nodes may be associated with multiple network interface modules of nodes integrated in at least one other loop of the network.

In similar fashion at least certain of the network interface modules of at least certain nodes may be associated with multiple distribution modules for distributing nodes integrated in at least one other loop of this network.

A plurality of connections may thus be envisaged.

In similar fashion, and although in the example described two loops are represented, a network having a different number of such loops may be envisaged.

The invention claimed is:

1. A transmission network for transmitting information comprising at least two associated loops for transmitting information, in each of which functional nodes, are integrated, each comprising at least one distribution module for distributing messages between the input and output ports of the node and at least one network interface module associated with the message distribution module, each message distribution module is distinct from each network interface module associated with the message distribution module, wherein the network interface modules of at least certain of the nodes of at least one of the loops are connected directly to the distribution modules of nodes of at least one other loop, without passing by the network interface modules of these nodes of the other loop.

2. The transmission network for transmitting information according to claim 1, wherein the at least one network interface module is associated with at least one application module.

3. The transmission network for transmitting information according to claim 1, wherein the loops are loops for conditional or unconditional propagation of messages, independent thereof.

4. The transmission network for transmitting information according to claim 1, wherein at least one of the loops is a loop for unidirectional propagation of messages.

5. The transmission network for transmitting information according to claim 1, wherein at least one of the loops is a loop for bidirectional propagation of messages.

6. The transmission network for transmitting information according to claim 1, wherein the loops are loops for propagation in the opposite direction or in the same direction of the messages.

7. The transmission network for transmitting information according to claim 1, wherein at least certain of the distribution modules of at least certain nodes are associated with multiple network interface modules of nodes integrated in at least one other loop.

8. The transmission network for transmitting information according to claim 1, wherein at least certain of the network interface modules of at least certain nodes are associated with multiple distribution modules for distributing nodes integrated in at least one other loop.

* * * * *